(12) United States Patent
Agrawal et al.

(10) Patent No.: US 10,699,381 B2
(45) Date of Patent: Jun. 30, 2020

(54) TEXT ENHANCEMENT USING A BINARY IMAGE GENERATED WITH A GRID-BASED GRAYSCALE-CONVERSION FILTER

(71) Applicant: Adobe Inc., San Jose, CA (US)

(72) Inventors: Ram Bhushan Agrawal, Noida (IN); Ankit Pangasa, Delhi (IN); Abhishek Shah, Delhi (IN)

(73) Assignee: Adobe Inc., San Jose, CA (US)

( * ) Notice: Subject to any disclaimer, the term of this patent is extended or adjusted under 35 U.S.C. 154(b) by 211 days.

(21) Appl. No.: 15/989,111

(22) Filed: May 24, 2018

(65) Prior Publication Data
US 2019/0362471 A1 Nov. 28, 2019

(51) Int. Cl.
| | |
|---|---|
| *G06K 9/34* | (2006.01) |
| *G06T 5/00* | (2006.01) |
| *G06T 7/136* | (2017.01) |
| *G06T 5/20* | (2006.01) |
| *G06K 9/38* | (2006.01) |

(52) U.S. Cl.
CPC ............. *G06T 5/001* (2013.01); *G06K 9/38* (2013.01); *G06T 5/007* (2013.01); *G06T 5/20* (2013.01); *G06T 7/136* (2017.01); *G06T 2207/10004* (2013.01); *G06T 2207/20024* (2013.01)

(58) Field of Classification Search
CPC .......... G06T 5/001; G06T 7/136; G06T 5/20; G06T 5/007; G06T 2207/10004; G06T 2207/20024; G06K 9/38; G06K 9/00442

USPC ......................................................... 382/176
See application file for complete search history.

(56) References Cited

U.S. PATENT DOCUMENTS 5,995,659 A * 11/1999 Chakraborty ...... G06K 9/00456
                                                          382/176
2017/0372460 A1* 12/2017 Zagaynov ............. G06T 3/0031

* cited by examiner

*Primary Examiner* — Andrew M Moyer
(74) *Attorney, Agent, or Firm* — Kilpatrick Townsend & Stockton LLP

(57) ABSTRACT

Certain embodiments involve a model for enhancing text in electronic content. For example, a system obtains electronic content comprising input text and converts the electronic content into a grayscale image. The system also converts the grayscale image into a binary image using a grid-based grayscale-conversion filter, which can include: generating a grid of pixels on the grayscale image; determining a plurality of grid-pixel threshold values at intersection points in the grid of pixels; determining a plurality of estimated pixel threshold values based on the plurality of grid-pixel threshold values; and converting the grayscale image into the binary image using the plurality of grid-pixel threshold values and the plurality of estimated pixel threshold values. The system also generates an interpolated image based on the electronic content and the binary image. The interpolated image includes output text that is darker than the input text. The system can then output the interpolated image.

20 Claims, 9 Drawing Sheets

TEXT ENHANCEMENT USING A BINARY IMAGE GENERATED WITH A GRID-BASED GRAYSCALE-CONVERSION FILTER

TECHNICAL FIELD

This disclosure generally relates to accessibility tools and more specifically to accessibility tools for enhancing text using a binary image generated with a grid-based grayscale-conversion filter.

BACKGROUND

In some instances, a document can include text that may be illegible such as, for example, a faded receipt, an old book, or a low-contrast reverse text document (e.g., a document that includes a dark background and light foreground text). In such instances, it may be difficult for a reader, particularly a visually impaired reader, to perceive the content of the document.

Existing solutions and methods for making such documents legible are limited. For instance, some existing systems may involve converting an electronic version of the document (e.g., an image of the document or a scanned version of the document) into machine-encoded text using optical character recognition techniques. However, optical character recognition techniques may be unable to accurately or properly identify or detect illegible characters or letters on such documents, which can prevent such systems from generating or outputting a version of the document that includes legible text. Moreover, conventional systems and methods for making such documents legible may involve manually adjusting an overall contrast level of the foreground and/or an overall contrast level of the background of the electronic version of the document. However, adjusting the overall contrast levels of the foreground and/or background of the electronic version of the document may not account for variations in contrast levels throughout the document, which can cause current systems and methods to generate a version of the document that is nonetheless illegible. In addition, conventional systems and methods for adjusting contrast levels of a document may not separate the foreground and background of the document. Rather, such conventional methods and systems may involve using one or more image contrast enhancement filters that may not account for differences between background pixels and foreground pixels.

Thus, existing systems and methods for converting a document that includes illegible text into a legible version of the document present disadvantages such as, but not limited to, those discussed above. As a result, a user or reader, such as a visually impaired user, may not be able to perceive the content of the documents.

SUMMARY

Various embodiments of the present disclosure provide systems and methods for enhancing text in electronic content using a binary image generated with a grid-based grayscale-conversion filter.

In one example, a method includes obtaining, by a processor, electronic content comprising input text. The method further includes converting, by the processor, the electronic content into a grayscale image. The method also includes converting, by the processor and using a grid-based grayscale-conversion filter, the grayscale image into a binary image. Converting the grayscale image into the binary image using the grid-based grayscale-conversion filter includes: generating a grid of pixels on the grayscale image; determining a plurality of grid-pixel threshold values at intersection points in the grid of pixels; determining a plurality of estimated pixel threshold values based on the plurality of grid-pixel threshold values; and converting the grayscale image into the binary image using the plurality of grid-pixel threshold values and the plurality of estimated pixel threshold values. The method further includes generating an interpolated image based on the electronic content and the binary image. The interpolated image includes output text that is darker than the input text. The method further includes outputting the interpolated image.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
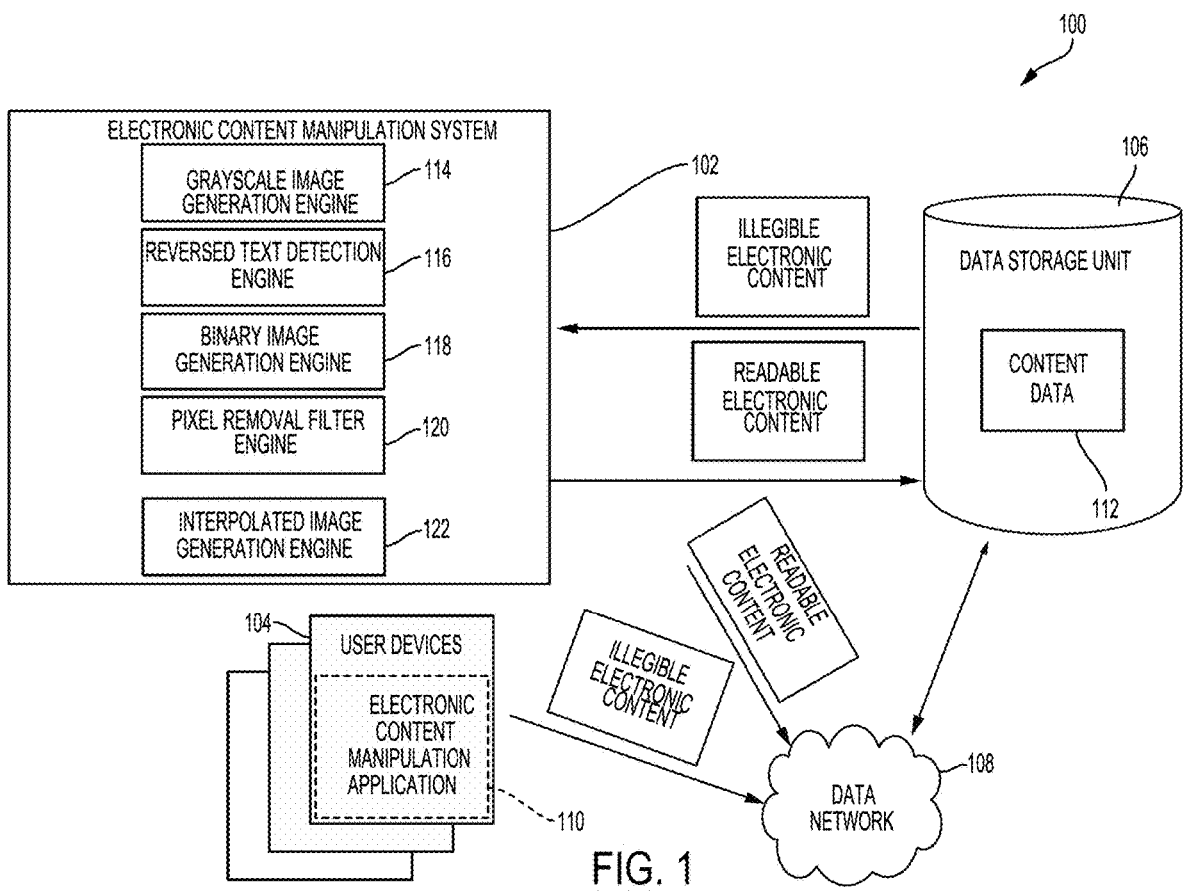
FIG. 1 is a block diagram of an exemplary environment in which an electronic content manipulation system enhances text in electronic content using a binary image generated with a grid-based grayscale-conversion filter in accordance with one or more embodiments.

Various aspects and features of the present disclosure relate to enhancing text in electronic content using a binary image generated with a grid-based grayscale-conversion filter. For instance, a document can included illegible text such as, for example, a faded receipt that includes light text.

An electronic content manipulation system can receive an electronic version of the document such as, for example, an image of the document or a scanned version of the document. The electronic content manipulation system can convert the electronic version of the document into a grayscale image in which the contents of the document (e.g., the foreground text and the background) are depicted in various shades of gray. The electronic content manipulation system can convert the grayscale image into a binary image using a grid-based grayscale-conversion filter. A binary image can be an image in which there are two possible values for each pixel in the image (e.g., zero for foreground text pixels or one for background pixels).

In this example, converting the grayscale image into the binary image using the grid-base grayscale-conversion filter includes generating a grid of pixels (e.g., an 8×8 grid of pixels) on the grayscale image and determining grid-pixel threshold values at intersection points of the grid, which indicate a threshold intensity value for a pixel at the intersection point. The electronic content manipulation system determines the grid-pixel threshold values based on an average intensity of pixels around or proximate the pixel at the intersection point, a standard deviation of the intensity of pixels around the pixel at the intersection point, and a predetermined value. In some examples, the electronic content manipulation system determines the standard deviation of the intensity of pixels around the intersection point pixel and, if the standard deviation value is below a predetermined threshold, the electronic content manipulation system can modify the grid of pixels (e.g., increase a size of the grid to a 16×16 grid) and re-calculate grid-pixel threshold values at intersection points of the modified grid. In this manner, the electronic content manipulation system can determine or assume whether pixels surrounding the intersection point pixel are similar (e.g., when the standard deviation value is below the threshold) and modify the grid accordingly.

The electronic content manipulation system also determines various estimated pixel threshold values for the remaining pixels in the grayscale image based on the determined grid-pixel threshold values at the four grid intersection points nearest each pixel (e.g., by using an interpolation method to estimate a pixel threshold value for a pixel based on the grid-pixel threshold values at the four grid intersection points closest to the pixel). Continuing with this example, the electronic content manipulation system uses the threshold values to separate pixels in the grayscale image into background pixels (e.g., background pixels assigned with a value of one) or foreground pixels (e.g., text pixels assigned with a value of zero). In this manner, the electronic content manipulation system can convert the grayscale image into the binary image using the grid-based grayscale-conversion filter.

The electronic content manipulation system can then generate an interpolated image based on the original electronic version of the document and the binary image. For instance, the electronic content manipulation system applies a factor to both the original electronic version of the document and the binary image to generate an interpolated image that preserves an appearance of the original electronic version and includes readable or legible text (e.g., text that is darker than the illegible or light text in the original electronic version). The electronic content manipulation system can then output the interpolated image for display to a user.

In this manner, the electronic content manipulation system can enhance text in electronic content using a binary image generated with a grid-based grayscale-conversion filter.

Embodiments of the present disclosure provide advantages over previous solutions. For example, systems and methods described herein provide the ability to enhance text (e.g., the readability of the text) in electronic content by using a binary image generated with a grid-based grayscale-conversion filter, which can obviate the use of optical character recognition techniques. In another example, systems and methods described herein can provide the ability to enhance text by using a binary image generated with a grid-based grayscale-conversion filter, which accounts for variations in intensity or contrast in a document or an electronic content of the document.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which an electronic content manipulation system 102 enhances text in electronic content using a binary image generated with a grid-based grayscale-conversion filter in accordance with one or more embodiments. Electronic content can include, but is not limited to, any electronic content that can include text, images, characters, objects, etc. Enhancing text in electronic content can include, for example, converting electronic content that includes illegible or light text (e.g., unreadable text) into electronic content that includes legible or darker text (e.g., readable text).

The environment 100 includes the electronic content manipulation system 102, one or more user devices 104, and one or more data storage units 106. The electronic content manipulation system 102, user device 104, and the data storage unit 106 are communicatively coupled via one or more data networks 108 (e.g., the Internet, one or more local area networks ("LAN"), one or more wired networks, or some combination thereof).

In some embodiments, a user of a computing device (not shown) or the user device 104 visits a webpage or an application store to explore applications supported by the electronic content manipulation system 102. The electronic content manipulation system 102 provides the application as a software as service ("SaaS"), or as a standalone application that may be installed on the computing device or the user device 104, or as a combination.

In some embodiments, the user devices 104 can be any type of client device and may include an electronic content manipulation application 110. In this example, one or more components of the electronic content manipulation system 102 may be stored on, implemented on, or executed by the user devices 104.

The data storage unit 106 stores content data 112 that includes various electronic content that can be provided to a user. As an example, the electronic content can include an electronic version of a document such as, for example, an image of a document or a scanned version of the document.

In some embodiments, the electronic content manipulation system 102 can be stored on, implemented on, or executed by a computing device, the user device 104, or any other device. The electronic content manipulation system 102 can include one or more instructions stored on a computer-readable storage medium and executable by one or more processors of the computing device, the user device 104, or other device. When executed by the one or more processors, the computer-executable instructions of the electronic content manipulation system 102 can cause the one or more processors to enhance text in electronic content using a binary image generated with a grid-based grayscale-conversion filter.

In some embodiments, the electronic content manipulation system 102 includes a grayscale image generation engine 114, a reversed text detection engine 116, a binary image generation engine 118, a pixel removal filter engine 120, and an interpolated image generation engine 122 which can be executed on a computing device, the user device 104, or any other device. For example, the engines 114, 116, 118, 120, 122 each include one or more instructions stored on a computer-executable storage medium and executable by processors of the computing device or user device 104. When executed by the one or more processors, the computer-executable instructions of the electronic content manipulation system 102 (e.g., the instructions of the engines 114, 116, 118, 120, 122) cause the electronic content manipulation system 102 to enhance text in electronic content using a binary image generated with a grid-based grayscale-conversion filter.

For example, the electronic content manipulation system 102 can obtain (e.g., receive) content data 112 indicating content to be provided to a user of a computing device, the user device 104, or any other device. In some examples, the electronic content manipulation system 102 obtains the content data 112 from the data storage unit 106, the user device 104, via user input (e.g., if a user programs a computing device to include the content data 112), or any other source. The content data 112 can include electronic content that can be provided to a user including, for, example, an electronic version of a document that includes illegible or light text (e.g., unreadable text) such as, for example, an image or scanned version of a faded receipt that includes light text.

In some embodiments, the grayscale image generation engine 114 causes the electronic content manipulation system 102 to analyze the electronic content obtained by the electronic content manipulation system 102 and convert the electronic content into a grayscale image. For example, the grayscale image generation engine 114 causes the electronic content manipulation system 102 to convert electronic content indicating an image of a document that includes light or illegible text into a grayscale image in which the contents of the document (e.g., the foreground text and the background) are depicted in various shades of gray. In some embodiments, the grayscale image generation engine 114 can cause the electronic content manipulation system 102 to convert the electronic content into a grayscale image or generate a grayscale image using the electronic content by using any suitable method or technique.

In some embodiments, the reversed text detection engine 116 can be electrically or communicatively coupled to the grayscale image generation engine 114. The reversed text detection engine 116 can cause the electronic content manipulation system 102 to access data on the grayscale image generation engine 114. In another example, the reversed text detection engine 116 can cause the electronic content manipulation system 102 to receive or obtain data from the grayscale image generation engine 114. In some embodiments, the reversed text detection engine 116 can cause the electronic content manipulation system 102 to analyze the grayscale image generated by the grayscale image generation engine 114 and determine (e.g., detect or identify) whether the electronic content received by the electronic content manipulation system 102 (e.g., the scanned version or image of the document) includes reversed text. In some embodiments, determining whether the electronic content includes reversed text can include determining whether the electronic content includes a dark background a light foreground (e.g., light foreground text). As an example, the reversed text detection engine 116 can cause the electronic content manipulation system 102 to analyze the grayscale image to determine whether the electronic content includes a dark background and light colored or white text. In some embodiments, the reversed text engine detection engine 116 can cause the electronic content manipulation system 102 to determine whether the electronic content includes reversed text based on the grayscale image using any suitable method or technique. For example, the reversed text engine 116 can cause the electronic content manipulation system 102 to convert the gray scale image into a binary image and analyze the binary image to determine whether the electronic content includes reversed text.

In some embodiments, the reversed text engine 116 can cause the electronic content manipulation system 102 to invert the electronic content in response to determining that the electronic content includes reversed text. As an example, the reversed text engine 116 can cause the electronic content manipulation system 102 to convert a dark background of the electronic content into a light or lighter background and convert a light foreground of the of the electronic content into a dark or darker foreground in response to determining that the electronic content includes reversed text. In some embodiments, the reversed text engine 116 can cause the electronic content manipulation system 102 to invert the electronic content using any suitable method or technique. In this example, the gray scale image generation engine 114 can then cause the electronic content manipulation system 102 to convert the inverted electronic content into a grayscale image in substantially the same manner as described above.

In some embodiments, the binary image generation engine 118 can be electrically or communicatively coupled to the grayscale image generation engine 114. The binary image generation engine 118 can cause the electronic content manipulation system 102 to access data on the grayscale image generation engine 114. In another example, the binary image generation engine 118 can cause the electronic content manipulation system 102 to receive or obtain data from the grayscale image generation engine 114. In some embodiments, the binary image generation engine 118 can cause the electronic content manipulation system 102 to analyze the grayscale image generated by the grayscale image generation engine 114 and convert the grayscale image into a binary image. In some embodiments, a binary image is an image in which there are two possible values for each pixel in the binary image (e.g., zero for foreground or dark text pixels or one for background or light pixels). In some embodiments, the binary image generation engine 118 can cause the electronic content manipulation system 102 to convert the grayscale image into a binary image or generate a binary image using the grayscale image by applying a grid-based grayscale-conversion filter to the grayscale image.

For example, the binary image generation engine 118 can cause the electronic content manipulation system 102 to identify, generate, or apply a grid of pixels (e.g., a 8n×8 grid of pixels) on the grayscale image and determine one or more grid-pixel threshold values at one or more intersection points in the grid of pixels. In some embodiments, a grid-pixel threshold value can indicate a threshold value for an intensity of a pixel at an intersection point. In some embodiments, the binary image generation engine 118 can cause the electronic content manipulation system 102 to determine the grid-pixel threshold values based on an average intensity of one or more pixels around a pixel at an intersection point of the grid, a standard deviation of intensity values of pixels proximate to (e.g., around) the pixel at the intersection point, and a predetermined value. In some embodiments, the electronic content manipulation system 102 can analyze the pixels around the pixel at the intersection point and determine the standard deviation of the intensity of the pixels. In this example, the electronic content manipulation system 102 can compare the standard deviation value to a threshold value to determine whether the standard deviation value is greater than or less than the threshold value. In some embodiments, if the standard deviation value is below the threshold value, the electronic content manipulation system 102 can determine or assume that the pixels around the pixel at the intersection point of the grid are similar. In some embodiments, the electronic content manipulation system 102 can then modify the grid of pixels such as, for example, by increasing a size of the grid to a 16×16 grid in response to determining that the standard deviation value is below the threshold value. In this example, the binary image generation engine 118 can cause the electronic content manipulation system 102 to determine grid-pixel threshold values at intersection points of the modified grid in substantially the same manner as described above. In some instances, the electronic content manipulation system 102 can iterate this process until the standard deviation of the intensity of pixels around a pixel at an intersection point in a grid is above the threshold value.

In some embodiments, the binary image generation engine 118 can cause the electronic content manipulation system 102 to determine various estimated pixel threshold values for one or more remaining pixels in the grayscale image (e.g., a pixel that is not at an intersection point of the grid of pixels). In some embodiments, the binary image engine 114 causes the electronic content manipulation system 102 to determine an estimated pixel threshold value for a pixel based on the determined grid-pixel threshold values at grid intersection points near or proximate to the pixel. As an example, the electronic content manipulation system 102 determines a pixel threshold value for a pixel by applying an interpolation algorithm to the grid-pixel values at the four grid intersection points nearest to the pixel, which can allow the electronic content manipulation system 102 to estimate the pixel threshold value for the pixel.

In some embodiments, the binary image generation engine 118 can cause the electronic content manipulation system 102 to generate a binary image from the grayscale image by using the grid-pixel threshold values and the estimated pixel threshold values to separate pixels in the grayscale image. For example, the electronic content manipulation system 102 can separate the various pixels into background pixels (e.g., light background pixels that can be assigned a value of one) and foreground pixels (e.g., dark foreground pixels that can be assigned a value of zero). As an example, the electronic content manipulation system 102 can analyze the grayscale image and determine an actual intensity of a pixel at an intersection point of the grid and compare the actual intensity of the pixel to the determined grid-pixel threshold value at that intersection point. In this example, the electronic content manipulation system 102 can assign the pixel a value of zero in response to determining that the actual intensity of the pixel is below the grid-pixel threshold value. In this manner, the electronic content manipulation system 102 can convert the grayscale image into a binary image using the grid-based grayscale conversion filter.

In some embodiments, the pixel removal filter engine 120 can be electrically or communicatively coupled to the binary image generation engine 118. The pixel removal filter engine 120 can cause the electronic content manipulation system 102 to access data on the binary image generation engine 118. In another example, the pixel removal filter engine 120 can cause the electronic content manipulation system 102 to obtain or receive data from the binary image generation engine 118. In some embodiments, the pixel removal filter engine 120 can cause the electronic content manipulation system 102 to analyze a binary image generated by the binary image generation engine 118 and identify or detect one or more pixels in the binary image. For instance, the electronic content manipulation system 102 can analyze the binary image and identify a noise pixel (e.g., an isolated dark pixel) in the binary image. In this example, the pixel removal filter engine 120 can cause the electronic content manipulation system 102 to generate a refined binary image by removing (e.g., filtering) the noise pixel from the binary image.

In some embodiments, the interpolated image generation engine 122 can be electrically or communicatively coupled to the binary image generation engine 118 or the pixel removal filter engine 120. The interpolated image generation engine 122 can cause the electronic content manipulation system 102 to access data on the binary image generation engine 118 or the pixel removal filter engine 120. In another example, the interpolated image generation engine 122 can cause the electronic content manipulation system 102 to obtain or receive data from the binary image generation engine 118 or the pixel removal filter engine 120. In some embodiments, the interpolated image generation engine 122 can cause the electronic content manipulation system 102 to analyze a binary image generated by the binary image generation engine 118 or a refined binary image generated by the pixel removal filter engine 120 and content data 112 received by the electronic content manipulation system 102 (e.g., the electronic version of the document that includes illegible or light text) and generate an interpolated image based on the binary image or the refined binary image and the content data 112. For example, the electronic content manipulation system 102 can obtain data indicating a factor or other value from a computing device, the user device 104, via user input (e.g., if a user programs the electronic content manipulation system 102 to include the factor or value), or any other source. The electronic content manipulation system 102 can apply the factor to both the original electronic version of the document and the refined binary image of the document generated by the pixel removal filter engine 120 to generate an interpolated image that preserves an appearance of the original electronic version of the document and includes readable or legible text (e.g., text that is darker than the illegible or light text in the original electronic version). The electronic content manipulation system 102 can then output the interpolated image for display to a user.

In the example depicted in FIG. 1, a user can interface with the one or more user devices 104 to access the electronic content manipulation system 102. In some embodiments, each of the user devices 104 represents various types of devices. For example, the user device 104 is a mobile device (e.g., a mobile telephone, a smartphone, a PDA, a tablet, a laptop, a camera, a tracker, a watch, a wearable device, etc.). The user device 104, however, in some embodiments, is a non-mobile device (e.g., a desktop computer or another type of client device). In some embodiments, the electronic content manipulation system 102 is executed on the one or more user devices 104 via the electronic content manipulation application 140. In this example, the user device 104 includes one or more components of the electronic content manipulation system 102. In some examples, a user can interface with user devices 104 to access data generated using the electronic content manipulation system 102. For instance, a user can interface with the user devices 104 to access electronic content including enhanced text (e.g., an interpolated image) generated using the electronic content manipulation system 102.

Although the exemplary environment 100 of FIG. 1 is depicted as having a certain number of components, in other embodiments, the exemplary environment 100 has any number of additional or alternative components. Further, while FIG. 1 illustrates a particular arrangement of the electronic content manipulation system 102, user devices 104, and the data storage unit 106, various additional arrangements are possible. As an example, while FIG. 1 illustrates data storage unit 106 and the electronic content manipulation system 102 as part of separate systems, in some embodiments, the data storage unit 106 and the electronic content manipulation system 102 are part of a single system. As another example, while FIG. 1 illustrates the engines 114, 116, 118, 120, 122 as separate engines, in some embodiments, the engines 114, 116, 118, 120, 122 are part of a single engine.

Figure 2:
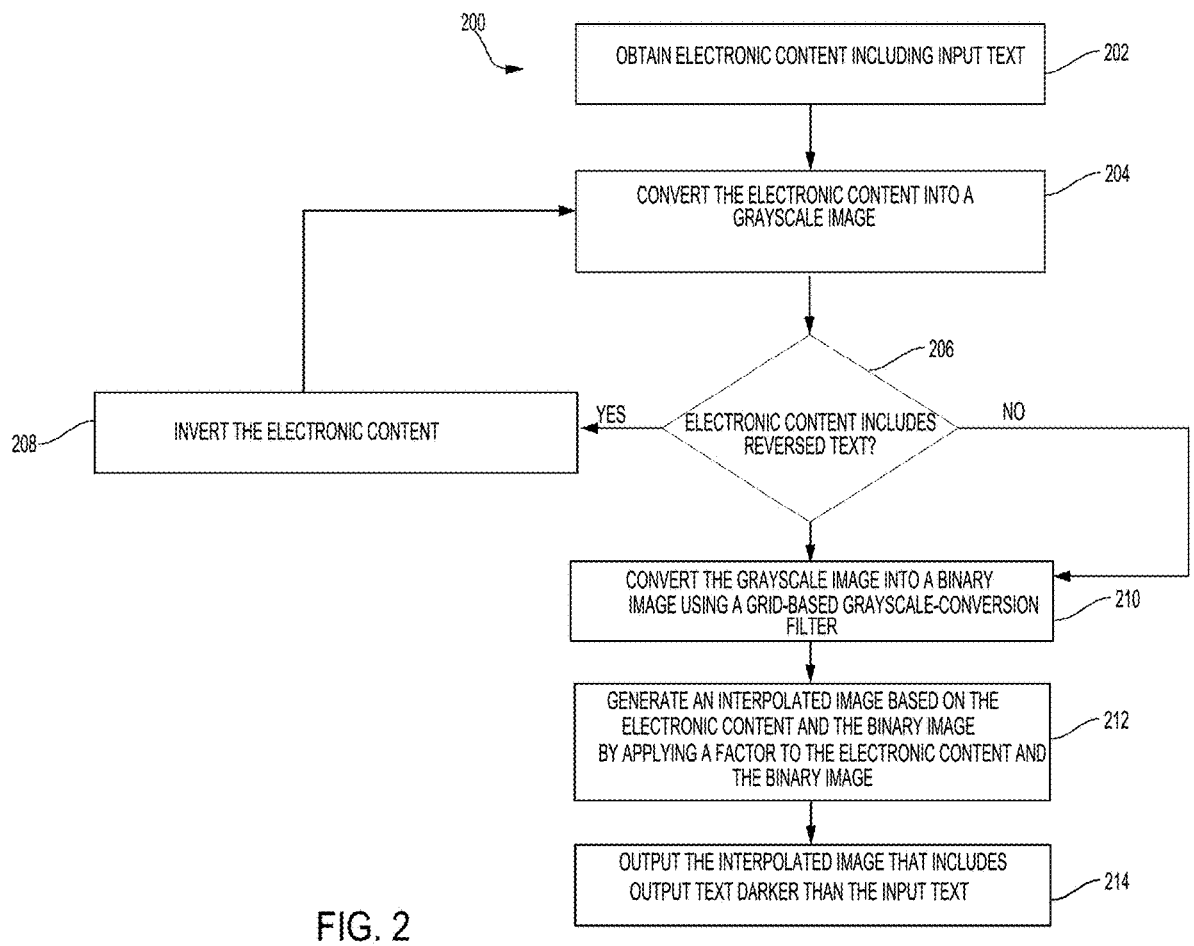
FIG. 2 is a flow chart depicting an example of a process for enhancing text in electronic content using a binary image generated with a grid-based grayscale-conversion filter in accordance with one or more embodiments.

FIG. 2 is a flow chart depicting an example of a process 200 for enhancing text in electronic content using a binary image generated with a grid-based grayscale-conversion filter in accordance with one or more embodiments. In some embodiments, one or more processing devices such as, for example, the computing system described herein with respect to FIG. 9, implement operations depicted in FIG. 2 by executing suitable program code (e.g., the electronic content manipulation system 102 of FIG. 1) that implements one or more algorithms encompassed by the process 200. For illustrative purposes, the process 200 is described with reference to the examples depicted in FIG. 1, but other implementations are possible.

In block 202, electronic content that includes input text is obtained (e.g., received). In some embodiments, one or more processing devices execute an electronic content manipulation system 102 to obtain content data 112 indicating content that can be provided to a user device 104 or any other device. In some instances, the electronic content manipulation system 102 can obtain the content data 112 from a data storage unit 106, the user device 104, via user input (e.g., if a user programs a computing device or the user device 104), or any other source. The content data 112 can include electronic content that can be provided to a user and can include text. As an example, the content data 112 can include an electronic version of a document that includes input text that is illegible or light (e.g., unreadable text) such as, for example, an image or scanned electronic version of a faded receipt or page of a book that includes light or illegible text.

Figure 3:
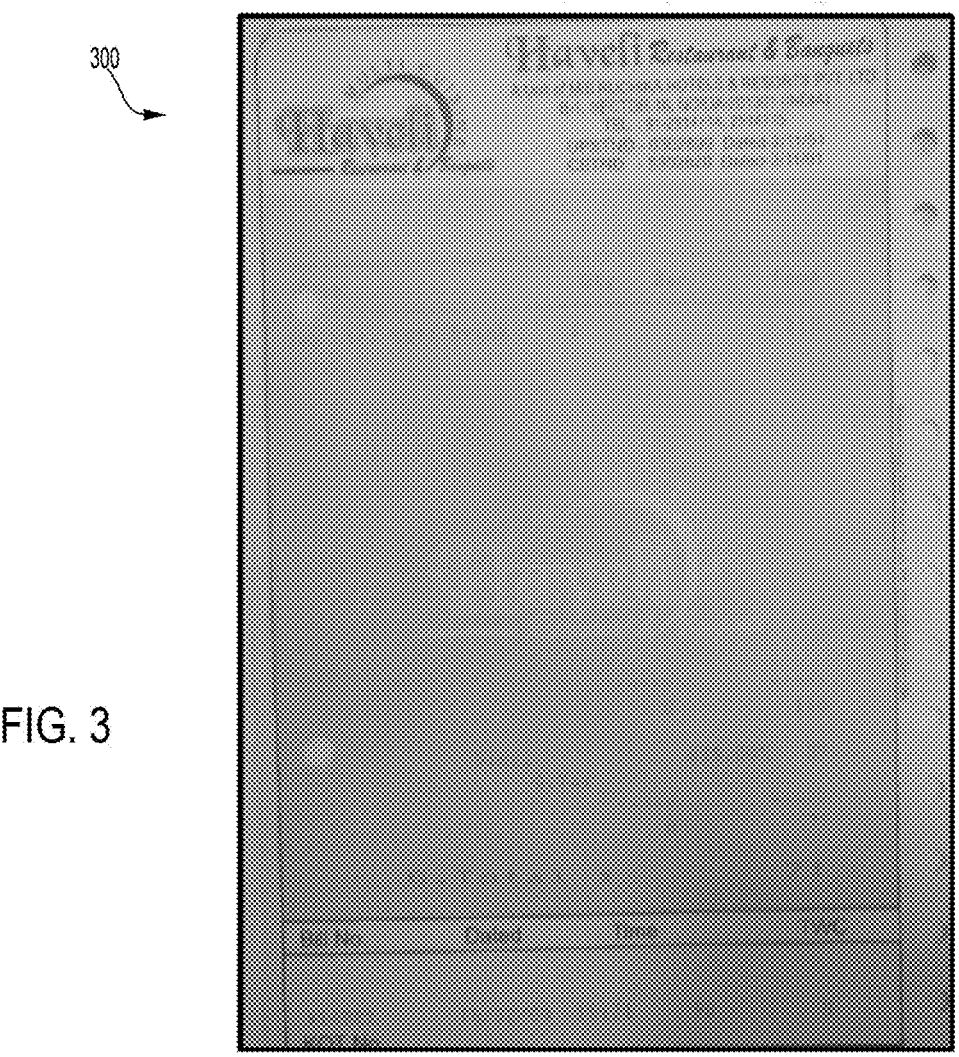
FIG. 3 is an image depicting an example of electronic content that includes illegible text in accordance with one or more embodiments.

For example, FIG. 3 is an image depicting an example of electronic content 300 that includes illegible text in accordance with one or more embodiments. In this example, the electronic content 300 is an electronic version of a document (e.g., an image of the document or a scanned version of the document) and the electronic content includes light or illegible input text.

Returning to FIG. 2, in block 204, the electronic content is converted into a grayscale image. In some examples, a grayscale image generation engine 114 causes the electronic content manipulation system 102 to convert the electronic content obtained by the electronic content manipulation system 102 (e.g., in block 202) into a grayscale image. In some embodiments, the grayscale image generation engine 114 includes one or more instructions stored on a computer-readable storage medium and executable by processors of one or more computing devices or the user device 104. When executed by the one or more processors, the computer-executable instructions cause the electronic content manipulation system 102 to analyze the electronic content obtained by the electronic content manipulation system 102 and convert the electronic content into a grayscale image. For example, and with reference to FIG. 3, the grayscale image generation engine 114 causes the electronic content manipulation system 102 to analyze the electronic content 300 and convert the image or scanned version of the document, along with the light or illegible input text into a grayscale image in which the contents of the document (e.g., the foreground text and the background) are depicted in various shades of gray. In some embodiments, the grayscale image generation engine 114 can cause the electronic content manipulation system 102 to convert the electronic content 300 into a grayscale image or generate a grayscale image based on the electronic content 300 by using any suitable method or technique.

Figure 4:
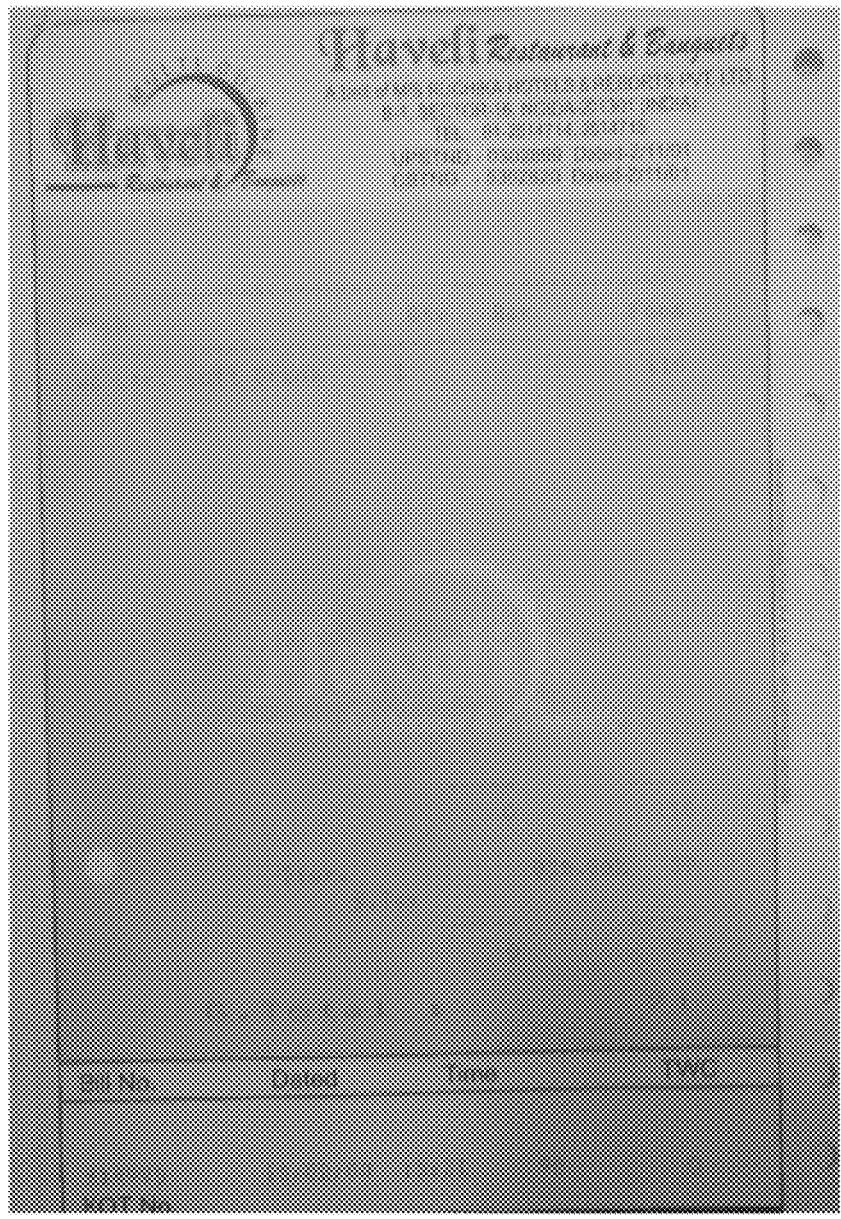
FIG. 4 is an image depicting an example of a grayscale image that can be generated by the electronic content manipulation system in accordance with one or more embodiments.

For example, FIG. 4 is an image depicting an example of a grayscale image 400 that can be generated by the electronic content manipulation system 102 in accordance with one or more embodiments. In this example, the grayscale image 400 is a version of the electronic content 300 of FIG. 3 in which the contents of the electronic content 300 are depicted in one or more shades of gray.

Returning to FIG. 2, in block 206, the electronic content manipulation system 102 determines whether the electronic content obtained in block 202 includes reversed text. In some examples, a reversed text detection engine 116 causes the electronic content manipulation system 102 to analyze the generated grayscale image to determine whether the electronic content includes reversed text. In some embodiments, the reversed text detection engine 116 includes one or more instructions stored on a computer-readable storage medium and executable by processors of one or more computing devices or the user device 104. When executed by the one or more processors, the computer-executable instructions cause the electronic content manipulation system 102 to analyze the grayscale image and determine whether the electronic content includes reversed text. For example, and with reference to FIG. 4, the reversed text detection engine 116 causes the electronic content manipulation system 102 to analyze the grayscale image 400 to determine whether the electronic content obtained in block 202 includes a dark background and a light foreground (e.g., light foreground text). As an example, the reversed text detection engine 116 can cause the electronic content manipulation system 102 to determine whether the electronic content obtained in block 202 includes a dark background and light colored or white text. In some embodiments, the reversed text engine detection engine 116 can cause the electronic content manipulation system 102 to analyze the grayscale image to determine whether the electronic content includes reversed text using any suitable method, algorithm, or technique.

For example, the reversed text detection engine 116 can cause the electronic content manipulation system 102 to use one or more algorithms to analyze the grayscale image 400 and generate a binary image using the grayscale image 400. An example of an algorithm that can be used by the electronic content manipulation system 102 to generate a binary image based on the grayscale image 400 can involve performing clustering-based image thresholding in which the electronic content manipulation system 102 can assume that the grayscale image 400 includes two classes of pixels following a bi-modal histogram (e.g., foreground pixels and background pixels). The electronic content manipulation system 102 can then determine a threshold that separates the two classes of pixels such that a combined spread of the two classes is minimal or equivalent, which can cause the inter-class variance of the two classes to be maximal. In some examples, the reversed text engine 116 can cause the electronic content engine to generate the binary image by separating the two classes of pixels. The electronic content manipulation system 102 can then determine whether the electronic content obtained in block 202 includes reversed text based on the binary image. For example, the reversed text detection engine 116 causes the electronic content manipulation engine to analyze the binary image to determine a number and a type of pixels (e.g., white pixels or black pixels) in the binary image. In this example, the electronic content manipulation system 102 can compare an amount of black pixels in the binary image to an amount of total pixels in the binary image to determine a ratio of black pixels to total pixels. Continuing with this example, the electronic content manipulation system 102 can compare the ratio to a threshold value (e.g., a predetermined or obtained threshold value) to determine whether the electronic content obtained in block 202 includes reversed text. For instance, if the ratio of black pixels to total pixels is above the threshold value, the electronic content manipulation system 102 can determine that the original electronic content (e.g., the electronic content obtained in block 202) includes reversed text. In some embodiments, if the electronic content manipulation determines in block 206 that the electronic content includes reversed text, the process 200 proceeds to block 208.

In block 208, the electronic content obtained in block 202 is inverted. In some embodiments, the reversed text engine 116 can cause the electronic content manipulation system 102 to generate an inverted electronic content in response to determining that the electronic content includes reversed text. As an example, the reversed text engine 116 can cause the electronic content manipulation system 102 to generate an inversed electronic content by converting a dark background of the electronic content into a light or lighter background and converting a light foreground of the of the electronic content into a dark or darker foreground in response to determining that the electronic content includes reversed text. In some embodiments, the reversed text engine 116 can cause the electronic content manipulation system 102 to invert the electronic content to generate an inverted electronic content using any suitable method or technique. As an example, the reversed text engine 116 can cause the electronic content manipulation system 102 to generate an inverted electronic content by converting (e.g., replacing) each of the channel values of R, G, B in the original electronic content with (255-R), (255-G), and (255-B), respectively.

In some embodiments, once the electronic content is inverted (e.g., in block 208), the process 200 can return to block 204 and the inverted electronic content can be converted into a grayscale image in substantially the same manner as described above. In this example, in block 206, the electronic content manipulation system 102 can determine that the inverted electronic content does not include reversed text based on the grayscale image and the process proceeds to block 210.

In block 210, the grayscale image is converted into a binary image using a grid-based grayscale-conversion filter. In some examples, a binary image generation engine 118 causes the electronic content manipulation system 102 to analyze the grayscale image (e.g., the grayscale image generated in block 204) and convert the grayscale image into a binary image. In some embodiments, a binary image is an image in which there are two possible values for each pixel in the binary image (e.g., zero for dark pixels or one for light pixels). In some embodiments, the binary image generation engine 118 can cause the electronic content manipulation system 102 to convert the grayscale image into a binary image or generate a binary image using the grayscale image by applying a grid-based grayscale-conversion filter to the grayscale image.

For example, the binary image generation engine 118 can cause the electronic content manipulation system 102 to identify, generate, or apply a grid of pixels (e.g., an 8×8 grid of pixels) on the grayscale image and determine one or more grid-pixel threshold values at one or more intersection points in the grid of pixels. In some embodiments, the binary image generation engine 118 can cause the electronic content manipulation system 102 to determine the grid-pixel threshold values based on an average intensity of one or more pixels around (e.g., proximate) a pixel at an intersection point of the grid, a standard deviation of intensity values of pixels around the pixel at the intersection point, and a predetermined value. As an example, the binary image generation engine 118 causes the electronic content manipulation system 102 to determine a grid-pixel threshold value based on the formula:

$$T_h = \mu + k \cdot \sigma$$

In the formula above, $T_h$ is a grid-pixel threshold value at an intersection point in a grid of pixels, $\mu$ represents an average intensity of one or more pixels around the pixel at the intersection point of the grid, k represents a predetermined constant or value, and $\sigma$ represents a standard deviation of intensity values of pixels around the pixel at the intersection point.

In some embodiments, the binary image generation engine 118 can cause the electronic content manipulation system 102 to analyze the pixels around the pixel at the intersection point and determine the standard deviation $\sigma$ of the intensity values of the pixels. In this example, the electronic content manipulation system 102 can compare the standard deviation value $\sigma$ to a threshold value to determine whether the standard deviation value is greater than or less than the threshold value. In some embodiments, if the standard deviation value is below the threshold value, the electronic content manipulation system 102 can determine or assume that the pixels around the pixel at the intersection point of the grid are similar. As an example, if one or more pixels around the pixel is a dark pixel (e.g., text) and the standard deviation value $\sigma$ is low or below the threshold value, the electronic content manipulation system 102 can determine that the pixels around the pixel at the intersection point are also dark pixels. In some embodiments, the electronic content manipulation system 102 can modify the grid of pixels such as, for example, by increasing a size of the grid to a 16×16 grid, in response to determining that the standard deviation value σ is below the threshold value. In this example, the electronic content manipulation system 102 can determine grid-pixel threshold values at intersection points of the modified grid. In some instances, the electronic content manipulation system 102 can iteratively determine the standard deviation value σ, compare the standard deviation value σ to the threshold value, and modify the grid until the standard deviation of the intensity of pixels around a pixel at an intersection point in a grid is above the threshold value.

In some embodiments, the binary image generation engine 118 can cause the electronic content manipulation system 102 to determine various estimated pixel threshold values for one or more remaining pixels in the grayscale image (e.g., a pixel that is not at an intersection point of the grid of pixels). In some embodiments, the binary image engine 114 causes the electronic content manipulation system 102 to determine an estimated pixel threshold value for a pixel based on the determined grid-pixel threshold values at grid intersection points near or proximate to the pixel. As an example, the electronic content manipulation system 102 determines a pixel threshold value for a pixel by applying an interpolation algorithm to the grid-pixel values at the four grid intersection points nearest to the pixel, which can allow the electronic content manipulation system 102 to estimate the pixel threshold value for the pixel. An example of an interpolation algorithm that can be used to determine or estimate a pixel threshold value for one or more pixels includes, but is not limited to, a bi-linear interpolation algorithm, which can include performing linear interpolation calculations for the pixel threshold value in one direction and then performing linear interpolation calculations for the pixel threshold value in another direction to estimate the pixel threshold value.

In some embodiments, the binary image generation engine 118 can cause the electronic content manipulation system 102 to generate a binary image from the grayscale image by using the grid-pixel threshold values and the estimated pixel threshold values to separate pixels in the grayscale image. For example, the electronic content manipulation system 102 can separate the various pixels into background pixels (e.g., light background pixels that can be assigned a value of one) or foreground pixels (e.g., dark foreground text pixels that can be assigned a value of zero). As an example, the electronic content manipulation system 102 can analyze the grayscale image and determine an actual intensity of a pixel at an intersection point of the grid and compare the actual intensity of the pixel to the determined grid-pixel threshold value at that intersection point. In this example, the electronic content manipulation system 102 can assign the pixel a value of zero in response to determining that the actual intensity of the pixel is below the grid-pixel threshold value. As another example, the electronic content manipulation system 102 can determine an actual intensity of another pixel in the grayscale image that is not at a grid intersection point and compare the actual intensity of the pixel to an estimated pixel threshold value associated with that pixel. In this example, the electronic content manipulation system 102 can assign that pixel a value of one in response to determining that the actual intensity of that pixel is above the estimated pixel threshold value associated with the pixel. In this manner, the electronic content manipulation system 102 can convert the grayscale image into a binary image using the grid-based grayscale conversion filter.

In some embodiments, in block 210, the electronic content manipulation system 102 analyzes a binary image generated by the binary image generation engine 118 and identifies or detects one or more pixels in the binary image. In some embodiments, a pixel removal filter engine 120 can cause the electronic content manipulation system 102 to analyze the binary image and identify or detect one or more pixels from the binary image. For instance, the electronic content manipulation system 102 can analyze the binary image and identify a noise pixel (e.g., an isolated dark pixel) in the binary image. In this example, the electronic content manipulation system 102 can remove (e.g., filter) the noise pixel from the binary image to generate a refined or filtered binary image.

Figure 5:
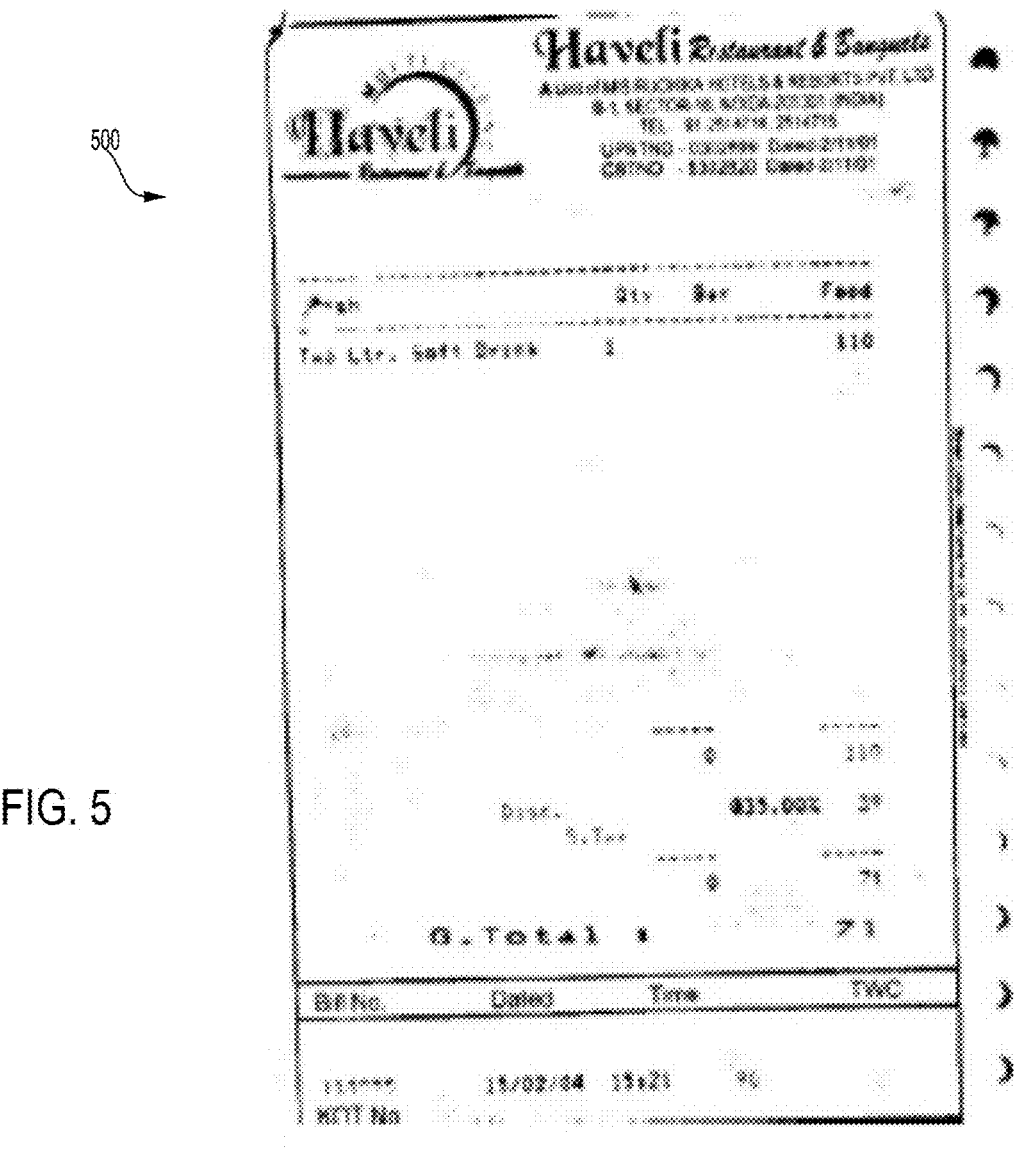
FIG. 5 is an image depicting an example of a binary image that can be generated by the electronic content manipulation system in accordance with one or more embodiments.

For example, FIG. 5 is an image depicting an example of a binary image 500 that can be generated by the electronic content manipulation system 102 in accordance with one or more embodiments. In this example, the binary image 500 is a refined binary image version of the grayscale image 400 of FIG. 4 in which the contents of the grays scale image 400 are depicted as one of two possible pixel values (e.g., each pixel is depicted as either a dark pixel or a light or white pixel).

Returning to FIG. 2, in block 212, an interpolated image is generated based on the electronic content (e.g., the original electronic content obtained in block 202) and the binary image (e.g., the binary image generated in block 210).

In some examples, an interpolated image generation 122 engine causes the electronic content manipulation system 102 to process the electronic content and the binary image to generate the interpolated image. For example, the interpolated image generation engine 122 causes the electronic content manipulation system 102 to obtain data indicating a factor or other value from a computing device, the user device 104, via user input (e.g., if a user programs the electronic content manipulation system 102 to include the factor or value), or any other source. The electronic content manipulation system 102 can apply the factor to both the original electronic content (e.g., the electronic content 300 of FIG. 3) and the binary image or the refined binary image (e.g., the binary image 500 of FIG. 5) to generate an interpolated image. In some examples, the interpolated image generation engine 122 can cause the electronic content manipulation system 102 to generate the interpolated image using one or more methods, algorithms, or techniques. As an example, the interpolated image generation engine 122 causes the electronic content manipulation system 102 to generate an interpolated image based on the formula:

$$I' = \alpha \cdot I_{ORIGIN} + (1-\alpha) I_{BINFIN}$$

In the formula above, I' is the interpolated image generated by the electronic content manipulation system 102, $I_{ORIGIN}$ represents the original electronic content obtained by the electronic content manipulation system (e.g., the electronic content 300 of FIG. 3), $I_{BINFIN}$ represents a refined or filtered binary image generated by the electronic content manipulation system 102, and α represents a factor or other value that can be applied to the original electronic content and the refined binary image. In some embodiments, α can be any suitable factor or value such as, for example, a factor ranging from zero to one. The electronic content manipulation system 102 can apply the factor α to both the original electronic content and the refined binary image (e.g., the binary image 500 of FIG. 5) to generate an interpolated image that preserves an appearance of the original electronic content and includes readable or legible text (e.g., text that is darker than the illegible or light text in the original electronic content). While in this example, the electronic content manipulation system 102 is described as generating an interpolated image based on the original electronic content and the refined binary image, the present disclosure is not limited to such configurations. Rather, in some embodiments, the electronic content manipulation system 102 can generate an interpolated image based on the original electronic content and a binary image in substantially the same manner as described above.

Figure 6:
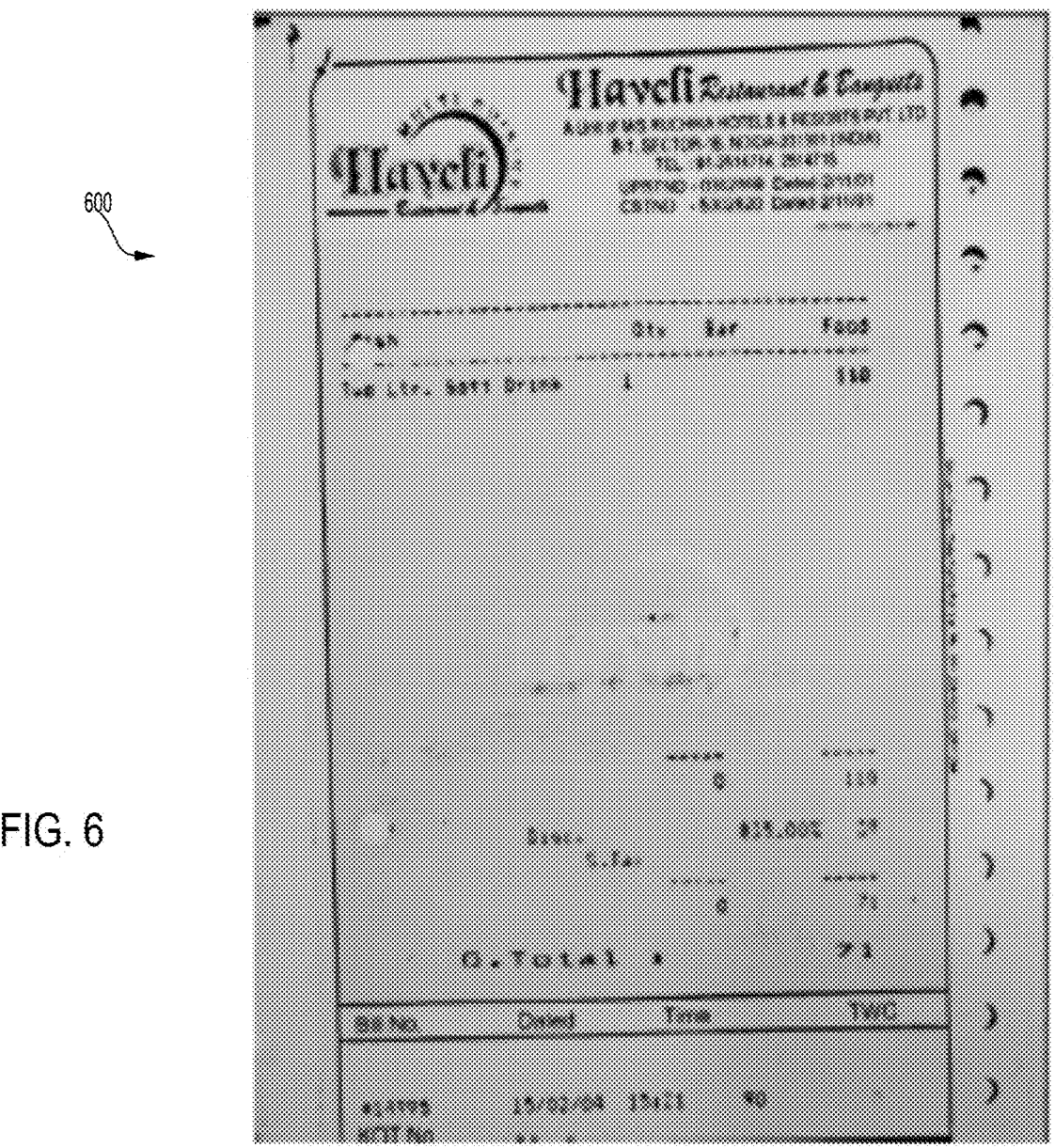
FIG. 6 is an image depicting an example of electronic content or an interpolated image that includes enhanced text that can be generated by the electronic content manipulation system in accordance with one or more embodiments.

For example, FIG. 6 is an image depicting an example of electronic content or an interpolated image 600 that includes enhanced text that can be generated by the electronic content manipulation system 102 in accordance with one or more embodiments. In this example, the interpolated image 600 is a version of the electronic content 300 of FIG. 3 that preserves an appearance of the original electronic content 300 and includes readable or legible output text (e.g., text that is darker than the illegible or light input text in the original electronic content 300).

Returning to FIG. 2, in block 214, the interpolated image that includes output text darker than the input text (e.g., the interpolated image 600 of FIG. 6) is output. In some embodiments, the electronic content manipulation system 102 can output the interpolated image via a user device 104 or any other computing device. In some examples, the electronic content manipulation system 102 can store the interpolated image in a memory of the user device 104 or the computing device or in the data storage unit 106.

Figure 7:
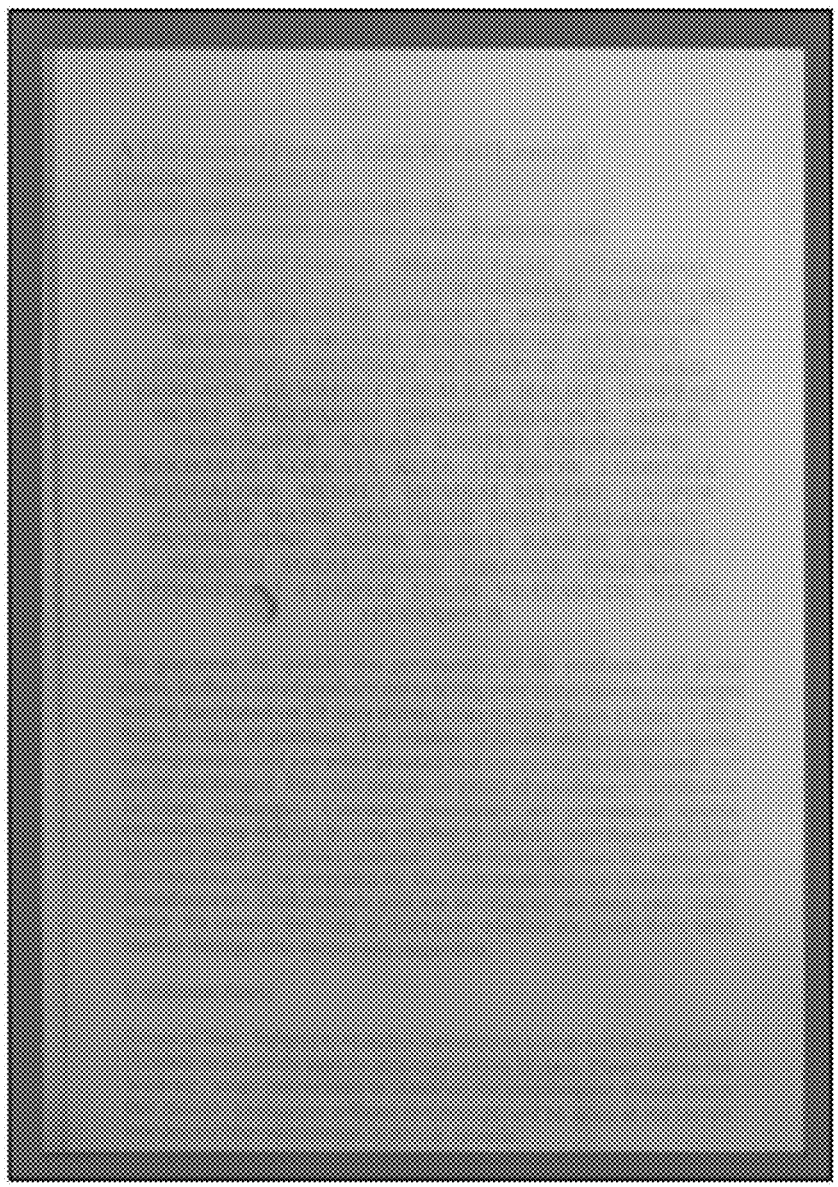
FIG. 7 is an image depicting an example of electronic content that includes illegible text in accordance with one or more embodiments.

FIG. 7 is an image depicting an example of electronic content 700 that includes illegible text in accordance with one or more embodiments. In the example depicted in FIG. 7, the electronic content 700 depicts a page or document that includes illegible or light input text.

Figure 8:
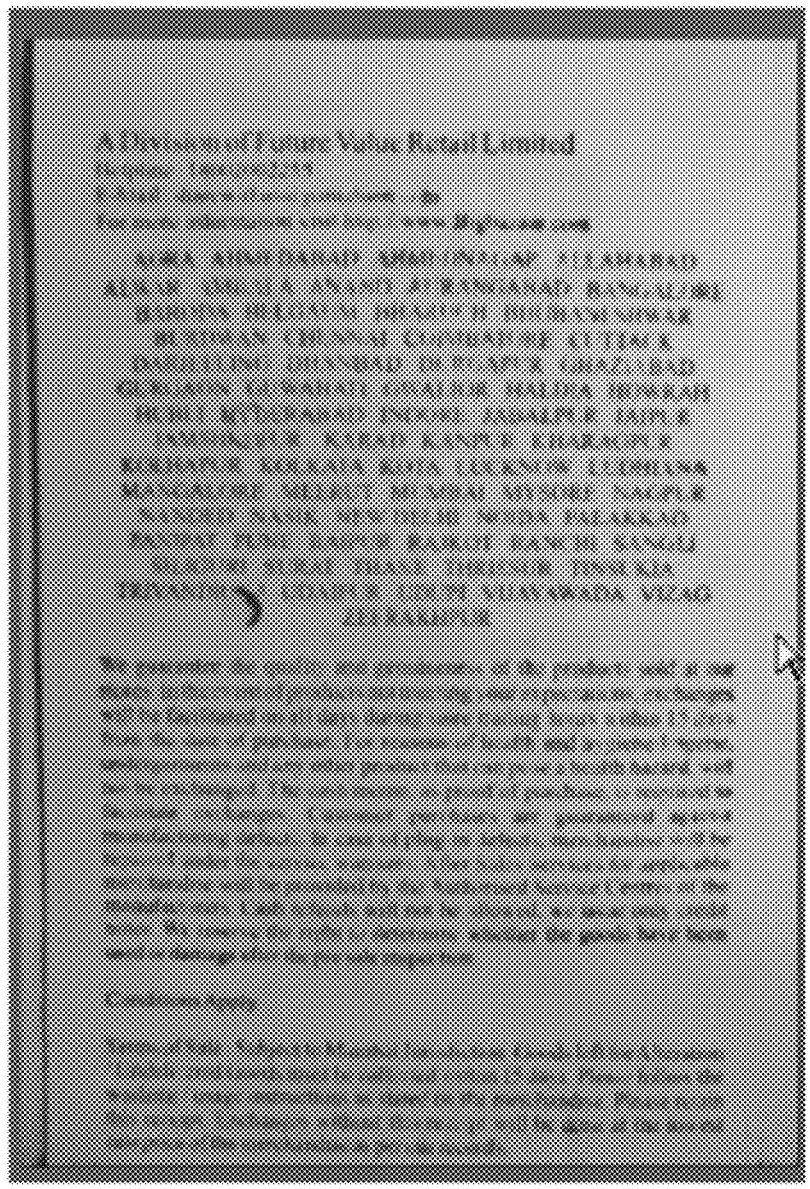
FIG. 8 is an image depicting an example of electronic content that includes enhanced text that can be generated by the electronic content manipulation system in accordance with one or more embodiments.

FIG. 8 is an image depicting an example of electronic content 800 that includes enhanced text that can be generated by the electronic content manipulation system 102 in accordance with one or more embodiments.

In this example, the electronic content 800 is an interpolated image version of the electronic content 700 of FIG. 7 that preserves an appearance of the original electronic content 700 and includes readable or legible output text (e.g., text that is darker than the illegible or light input text in the original electronic content 700).

System Implementation Example

Figure 9:
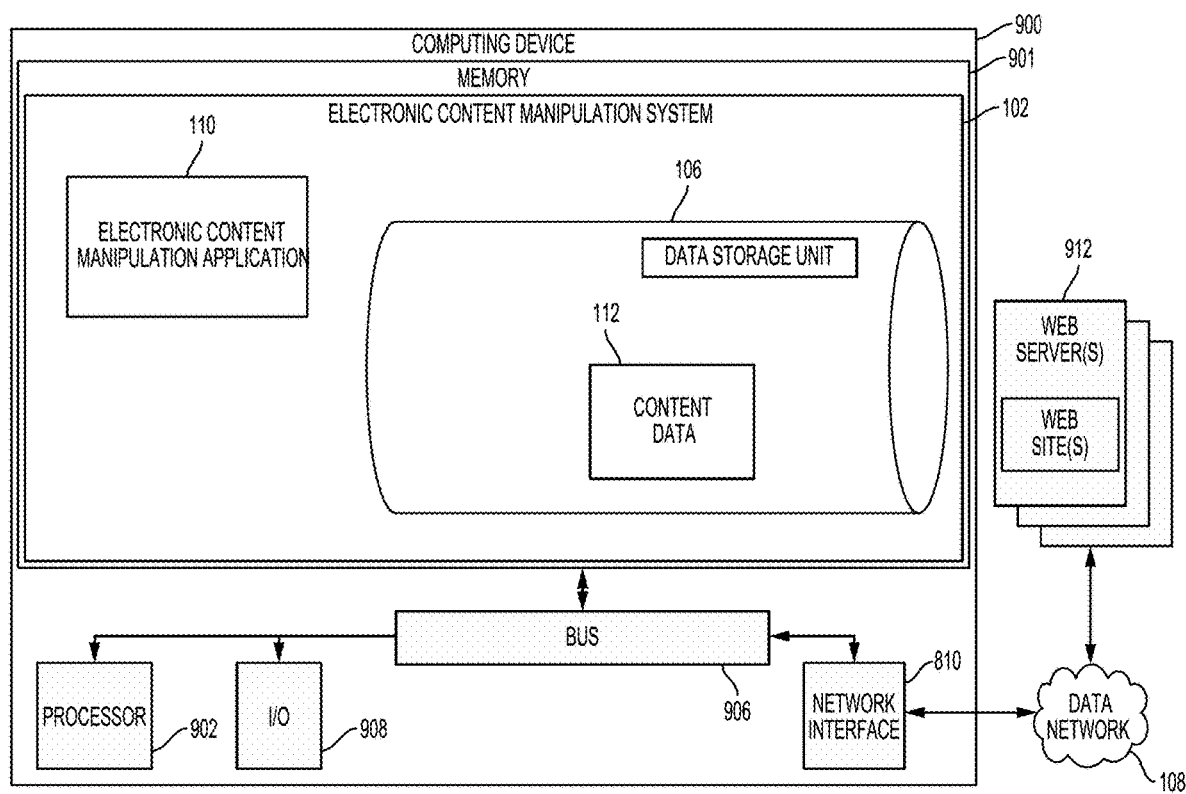
FIG. 9 is an example of a block diagram of a computing device that executes an electronic content manipulation system to enhance text in electronic content in accordance with one or more embodiments.

Any suitable computing system or group of computing systems can be used for performing the operations described herein. FIG. 9 is an example of a block diagram of a computing device that executes an electronic content manipulation system 102 to perform the operations described herein.

In some embodiments, a computing device 900 represents various types of devices. For example, the computing device 900 is a mobile device (e.g., a mobile telephone, a smartphone, a PDA, a tablet, a laptop, a camera, a tracker, a watch, a wearable device, etc.). The computing device 900, however, in some embodiments, is a non-mobile device (e.g., a desktop computer or another type of client device). In this example, the electronic content manipulation system 102 is implemented on, executed by, or stored on one or more computing devices 900. For example, the electronic content manipulation system 102 is stored on a memory device 901 of the computing device 900. In some embodiments, the electronic content manipulation system 102 is executed on the one or more computing devices 900 via an electronic content manipulation application 110.

The depicted example of the computing device 900 includes one or more processors 902 communicatively coupled to one or more memory devices 901. The processor 902 executes computer-executable program code stored in the memory device 901, accesses information stored in the memory device 901, or both. Examples of the processor 902 include a microprocessor, an application-specific integrated circuit ("ASIC"), a field-programmable gate array ("FPGA"), or any other suitable processing device. The processor 902 can include any number of processing devices, including one or more processors 902 that are configured by program code to implement the operations described above, such as the operations depicted in FIGS. 1-2 that are described with respect to processing devices.

The memory device 901 includes any suitable non-transitory computer-readable medium for storing the electronic content manipulation system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 901 are used to implement the operations described above, such as the operations depicted in FIGS. 1-2 that are described with respect to one or more non-transitory computer-readable media.

The computing device 900 may also include a number of external or internal devices such as input or output devices. For example, the computing device 900 is shown with an input/output ("I/O") interface 908 that can receive input from input devices or provide output to output devices. A bus 906 can also be included in the computing device 900. The bus 906 can communicatively couple one or more components of the computing device 900. In some embodiments, the bus 906 is used to implement the operations described above with respect to FIGS. 1-2 that involve communicating signals via a data bus.

The computing device 900 executes program code that configures the processor 902 to perform one or more of the operations described above with respect to FIGS. 1-2. The program code includes, for example, the electronic content manipulation application 110 or other suitable applications that perform one or more operations described herein. The program code may be resident in the memory device 901 or any suitable computer-readable medium and may be executed by the processor 902 or any other suitable processor. In some embodiments, the program code described above is stored in the memory device 901, as depicted in FIG. 9. In additional or alternative embodiments, the program code described above is stored in one or more memory devices accessible via a data network.

The computing device 900 accesses the content data 112 in any suitable manner. In some embodiments, the content data 112 is stored in one or more memory devices accessible via a data network 108. In additional or alternative embodiments, some or all of the content data 112 is stored in the memory device 901.

The computing device 900 depicted in FIG. 9 also includes at least one network interface 910. The network interface 910 includes any device or group of devices suitable for establishing a wired or wireless data connection to one or more data networks 108. Non-limiting examples of the network interface 910 include an Ethernet network adapter, a modem, and/or the like. The computing device 900 is able to communicate with one or more servers via the network interface 910. In some embodiments, the network interface 910 is used to implement the operations described above with respect to FIGS. 1-2 that involve communicating signals via a data network.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
    obtaining, by a processor, electronic content comprising input text;
    converting, by the processor, the electronic content into a grayscale image;
    converting, by the processor and using a grid-based grayscale-conversion filter, the grayscale image into a binary image, wherein converting the grayscale image into the binary image using the grid-based grayscale-conversion filter comprises:
        generating a grid of pixels on the grayscale image;
        determining a plurality of grid-pixel threshold values at intersection points in the grid of pixels;
        determining a plurality of estimated pixel threshold values based on the plurality of grid-pixel threshold values; and
        converting the grayscale image into the binary image using the plurality of grid-pixel threshold values and the plurality of estimated pixel threshold values;
    generating, by the processor, an interpolated image based on the electronic content and the binary image, wherein the interpolated image comprises output text that is darker than the input text; and
    outputting, by the processor, the interpolated image.

2. The method of claim 1, further comprising:
    generating, by the processor and using a pixel removal filter, a filtered binary image based on the binary image by filtering a pixel from the binary image, and wherein generating the interpolated image comprises:
        generating the interpolated image based on the electronic content and the filtered binary image.

3. The method of claim 1, further comprising:
    prior to converting the grayscale image into the binary image using the grid-based grayscale-conversion filter:
        determining, by the processor and based on the grayscale image, whether the electronic content includes a reversed text by, the reversed text indicating that the electronic content includes a dark background and a light foreground;
        inverting, by the processor and in response to determining that the electronic content includes the reversed text, the electronic content by:
            converting the dark background into a light background; and
            converting the light foreground into a dark foreground.

4. The method of claim 3, wherein determining whether the electronic content includes the reversed text based on the grayscale image comprises:
    converting, by the processor, the grayscale image into a first binary image, the first binary image including a number of black pixels and a number of white pixels;
    comparing, by the processor, the number of black pixels in the first binary image to a total number of pixels in the first binary image to determine a ratio of the black pixels to the total number of pixels;
    comparing, by the processor, the ratio to a threshold value; and determining, by the processor, that the electronic content includes the reversed text when the ratio is above the threshold value or that the electronic content does not include the reversed text when the ratio is below the threshold value.

5. The method of claim 1, wherein determining the plurality of estimated pixel threshold values based on the plurality of grid-pixel threshold values comprises:
  determining, by the processor, an interpolated pixel threshold value for a pixel in the grayscale image based on a first plurality of grid-pixel threshold values of a plurality of intersection point pixels proximate to the pixel.

6. The method of claim 1, wherein determining the plurality of grid-pixel threshold values at intersection points of the grid comprises:
  determining, by the processor, a grid-pixel threshold value at an intersection point of the grid of pixels based on an average intensity of pixels proximate to an intersection point pixel, a standard deviation of an intensity of pixels proximate to the intersection point pixel, and a predetermined value.

7. The method of claim 6, wherein converting the grayscale image into the binary image using the grid-based grayscale-conversion filter further comprises:
  comparing, by the processor, the standard deviation of the intensity of pixels proximate to the intersection point pixel to a threshold value;
  generating, by the processor, a modified grid of pixels on the grayscale image in response to determining that the standard deviation is less than the threshold value, wherein the modified grid of pixels has a larger size than the grid of pixels; and
  converting, by the processor and using the grid-based grayscale-conversion filter, the grayscale image into the binary image based on the modified grid of pixels.

8. A system comprising:
  a processing device; and
  a non-transitory computer-readable medium communicatively coupled to the processing device, wherein the processing device is configured to perform operations comprising:
    obtaining electronic content comprising input text;
    converting the electronic content into a grayscale image;
  converting, using a grid-based grayscale-conversion filter, the grayscale image into a binary image, wherein converting the grayscale image into the binary image using the grid-based grayscale-conversion filter comprises:
    generating a grid of pixels on the grayscale image;
    determining a plurality of grid-pixel threshold values at intersection points in the grid of pixels;
    determining a plurality of estimated pixel threshold values based on the plurality of grid-pixel threshold values; and
    converting the grayscale image into the binary image using the plurality of grid-pixel threshold values and the plurality of estimated pixel threshold values;
  generating an interpolated image based on the electronic content and the binary image, wherein the interpolated image comprises output text that is darker than the input text; and
  outputting the interpolated image.

9. The system of claim 8, wherein the processing device is further configured to:
  generate, using a pixel removal filter, a filtered binary image based on the binary image by filtering a pixel from the binary image, and wherein generating the interpolated image comprises generating the interpolated image based on the electronic content and the filtered binary image.

10. The system of claim 8, wherein the processing device is further configured to:
  prior to converting the grayscale image into the binary image using the grid-based grayscale-conversion filter:
    determine, based on the grayscale image, whether the electronic content includes a reversed text by, the reversed text indicating that the electronic content includes a dark background and a light foreground;
    invert, in response to determining that the electronic content includes the reversed text, the electronic content by:
      converting the dark background into a light background; and
      converting the light foreground into a dark foreground.

11. The system of claim 10, wherein the processing device is further configured to determine whether the electronic content includes the reversed text based on the grayscale image by
  converting, the grayscale image into a first binary image, the first binary image including a number of black pixels and a number of white pixels;
  comparing the number of black pixels in the first binary image to a total number of pixels in the first binary image to determine a ratio of the black pixels to the total number of pixels;
  comparing the ratio to a threshold value; and
  determining that the electronic content includes the reversed text when the ratio is above the threshold value or that the electronic content does not include the reversed text when the ratio is below the threshold value.

12. The system of claim 8, wherein the processing device is further configured to determine the plurality of estimated pixel threshold values based on the plurality of grid-pixel threshold values by:
  determining an interpolated pixel threshold value for a pixel in the grayscale image based on a first plurality of grid-pixel threshold values of a plurality of intersection point pixels proximate to the pixel.

13. The system of claim 8, wherein the processing device is further configured to determine the plurality of grid-pixel threshold values at intersection points of the grid by:
  determining a grid-pixel threshold value at an intersection point of the grid of pixels based on an average intensity of pixels proximate to an intersection point pixel, a standard deviation of an intensity of pixels proximate to the intersection point pixel, and a predetermined value.

14. The system of claim 13, wherein the processing device is further configured to convert the grayscale image into the binary image using the grid-based grayscale-conversion filter by:
  comparing the standard deviation of the intensity of pixels proximate to the intersection point pixel to a threshold value;
  generating a modified grid of pixels on the grayscale image in response to determining that the standard deviation is less than the threshold value, wherein the modified grid of pixels has a larger size than the grid of pixels; and converting, using the grid-based grayscale-conversion filter, the grayscale image into the binary image based on the modified grid of pixels.

15. A system comprising:

a means for obtaining electronic content comprising input text;

a means for converting the electronic content into a grayscale image;

a means for converting, using a grid-based grayscale-conversion filter, the grayscale image into a binary image, wherein converting the grayscale image into the binary image using the grid-based grayscale-conversion filter comprises:

generating a grid of pixels on the grayscale image;

determining a plurality of grid-pixel threshold values at intersection points in the grid of pixels;

determining a plurality of estimated pixel threshold values based on the plurality of grid-pixel threshold values; and converting the grayscale image into the binary image using the plurality of grid-pixel threshold values and the plurality of estimated pixel threshold values;

a means for generating an interpolated image based on the electronic content and the binary image, wherein the interpolated image comprises output text that is darker than the input text; and a means for outputting the interpolated image.

16. The system of claim 15, further comprising:

a means for generating, using a pixel removal filter, a filtered binary image based on the binary image by filtering a pixel from the binary image, and wherein generating the interpolated image comprises:

generating the interpolated image based on the electronic content and the filtered binary image.

17. The system of claim 15, further comprising:

a means for, prior to converting the grayscale image into the binary image using the grid-based grayscale-conversion filter:

determining, based on the grayscale image, whether the electronic content includes a reversed text by, the reversed text indicating that the electronic content includes a dark background and a light foreground;

inverting, in response to determining that the electronic content includes the reversed text, the electronic content by:

converting the dark background into a light background; and converting the light foreground into a dark foreground.

18. The system of claim 17, wherein determining whether the electronic content includes the reversed text based on the grayscale image comprises:

converting the grayscale image into a first binary image, the first binary image including a number of black pixels and a number of white pixels;

comparing the number of black pixels in the first binary image to a total number of pixels in the first binary image to determine a ratio of the black pixels to the total number of pixels;

comparing the ratio to a threshold value; and determining that the electronic content includes the reversed text when the ratio is above the threshold value or that the electronic content does not include the reversed text when the ratio is below the threshold value.

19. The system of claim 15, wherein determining the plurality of estimated pixel threshold values based on the plurality of grid-pixel threshold values comprises:

determining an interpolated pixel threshold value for a pixel in the grayscale image based on a first plurality of grid-pixel threshold values of a plurality of intersection point pixels proximate to the pixel.

20. The system of claim 15, wherein determining the plurality of grid-pixel threshold values at intersection points of the grid comprises:

determining a grid-pixel threshold value at an intersection point of the grid of pixels based on an average intensity of pixels proximate to an intersection point pixel, a standard deviation of an intensity of pixels proximate to the intersection point pixel, and a predetermined value, and wherein converting the grayscale image into the binary image using the grid-based grayscale-conversion filter further comprises:

comparing the standard deviation of the intensity of pixels proximate to the intersection point pixel to a threshold value;

generating a modified grid of pixels on the grayscale image in response to determining that the standard deviation is less than the threshold value, wherein the modified grid of pixels has a larger size than the grid of pixels; and converting, using the grid-based grayscale-conversion filter, the grayscale image into the binary image based on the modified grid of pixels.

* * * * *